(12) United States Patent
Dorsch et al.

(10) Patent No.: US 8,622,094 B2
(45) Date of Patent: Jan. 7, 2014

(54) METAL DUSTING PROTECTION FOR WELDED PIPE ASSEMBLIES

(75) Inventors: Larry Thomas Dorsch, Orefield, PA (US); William Robert Licht, Allentown, PA (US); David R. Kerstetter, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 257 days.

(21) Appl. No.: 13/204,110

(22) Filed: Aug. 5, 2011

(65) Prior Publication Data
US 2013/0019986 A1  Jan. 24, 2013

Related U.S. Application Data

(60) Provisional application No. 61/508,814, filed on Jul. 18, 2011.

(51) Int. Cl.
  *F16L 9/22* (2006.01)
  *F16L 9/14* (2006.01)

(52) U.S. Cl.
  USPC ...... 138/155; 138/149; 228/216; 228/262.41; 285/47; 285/48; 285/55; 285/288.1; 285/288.11

(58) Field of Classification Search
  USPC ........ 138/155, 149; 228/216, 262.41; 285/47, 285/48, 55, 288.1, 288.11
  See application file for complete search history.

(56) References Cited

U.S. PATENT DOCUMENTS

| | | | |
|---|---|---|---|
| 2,820,427 A * | 1/1958 | Chyle et al. | 228/50 |
| 2,895,747 A * | 7/1959 | Bland et al. | 285/21.1 |
| 3,220,876 A | 11/1965 | Moeller | |
| 3,508,766 A * | 4/1970 | Berg et al. | 285/21.1 |
| 3,527,288 A | 9/1970 | Guthrie | |
| 3,965,555 A * | 6/1976 | Webster et al. | 29/890.14 |
| 3,972,466 A * | 8/1976 | Keith | 228/216 |
| 4,415,184 A * | 11/1983 | Stephenson et al. | 285/47 |
| 4,444,420 A * | 4/1984 | McStravick et al. | 285/47 |
| 4,640,532 A * | 2/1987 | Pope | 285/41 |
| 5,104,152 A * | 4/1992 | Galfant | 285/47 |
| 5,135,777 A * | 8/1992 | Davis et al. | 427/217 |
| 5,451,741 A * | 9/1995 | Doronin et al. | 219/160 |
| 5,685,572 A * | 11/1997 | Linton et al. | 285/21.2 |
| 6,139,649 A * | 10/2000 | Wynns | 148/277 |
| 6,602,355 B2 | 8/2003 | Alstrup et al. | |
| 6,719,186 B2 * | 4/2004 | Mudge et al. | 228/215 |
| 7,543,733 B2 | 6/2009 | Wastiaux et al. | |
| 2007/0145737 A1 * | 6/2007 | Benninga | 285/123.3 |

OTHER PUBLICATIONS

Mueller, Rod T., "Process Piping Systems," Piping Handbook (7th Edition), McGraw-Hill, Nayyar, Mohinder L. (Editor), 2000, pp. C.305 and C.356-C.358.

* cited by examiner

*Primary Examiner* — Kevin P Shaver
*Assistant Examiner* — Nicholas J Weiss
(74) *Attorney, Agent, or Firm* — Bryan C. Hoke, Jr.

(57) ABSTRACT

A method for protecting a welded pipe assembly from metal dusting and a welded pipe assembly suitable for performing the method. The welded pipe assembly comprises two pipes, weld material joining the two pipes and insulating material. The pipes are protected from metal dusting by a protective coating. The present invention is useful for conveying gases comprising carbon monoxide at temperatures greater than 425° C. while preventing metal dusting of the welded piping assembly.

2 Claims, 2 Drawing Sheets

ABSTRACT# METAL DUSTING PROTECTION FOR WELDED PIPE ASSEMBLIES

CROSS-REFERENCE TO RELATED APPLICATIONS

This application claims priority to provisional application U.S. Ser. No. 61/508,814, titled "Metal Dusting Protection for Welded Pipe Assemblies", filed Jul. 18, 2011, the contents of which are hereby incorporated by reference.

BACKGROUND

The present invention relates to a method for protecting a welded pipe assembly from metal dusting and a welded pipe assembly suitable for performing the method. The present invention is useful for conveying gases comprising carbon monoxide at temperatures greater than 425° C. while preventing metal dusting of the welded piping assembly.

Corrosion by metal dusting is a significant problem for industrial processes in which gases comprising carbon monoxide are conveyed at elevated temperature. Under these conditions, the gas reacts with the metal pipe. The reaction may cause rapid pitting or general wastage of the pipe alloy. Carbon diffuses into the metal often with preferential diffusion paths along the grain boundaries. The carbon can cause the grains to separate from the bulk as a metal dust rich in carbon. This corrosion mechanism is also known as catastrophic carburization.

Many industrial processes use or produce gases containing carbon monoxide. Production of these gases is typically done at elevated temperature. Examples include hydrogen or synthesis gas production by steam reforming, autothermal reforming, partial oxidation and gasification. Downstream of these production units the pipes may be subject to corrosion by metal dusting. Synthesis gas, also called syngas, is a mixture of hydrogen and carbon monoxide.

Various solutions have been proposed in order to reduce metal dusting, including the use of surface coatings which increase the corrosion resistance of the pipes. For example the interior surfaces of the pipes may be aluminized in order to limit metal dusting.

Effective aluminization is typically done by chemical vapor deposition at high temperature which results in a diffusion layer rich in aluminum on the surface of the material being coated. Fabricated components can be aluminized in this way, but there are some issues. One issue is that the size of component to be aluminized is limited by size of the furnace and the retort in which the component is to be placed. Larger furnaces and retorts are theoretically possible, but controlling the temperature uniformity necessary to achieve an effective coating becomes increasingly difficult and ultimately results in a practical limitation. Another issue is that components distort due to high temperature exposure which may limit the size and complexity of prefabricated components. So, there is a need to make final assembly of equipment in the field.

Assembling the equipment by welding piping connections presents problems when the piping and/or equipment has been coated to protect against metal dusting. This is because the welding destroys the protection of the welded region and adversely affects the protection of the adjacent region.

Industry desires methods for preventing metal dusting of welded pipe assemblies.

Industry desires methods for preventing metal dusting of welded pipe assemblies that can be applied in the field.

Industry desires welded pipe assemblies protected from metal dusting.

Industry desires welded pipe assemblies protected from metal dusting that can be constructed in the field.

BRIEF SUMMARY

There are several aspects of the welded pipe assembly and method for protecting a welded pipe assembly from metal dusting as outlined below.

Aspect #1. A welded pipe assembly comprising:
a first pipe having an exterior side and an interior side opposite the exterior side, the interior side of the first pipe having a barrier to carbon penetration;
a second pipe having an exterior side and an interior side opposite the exterior side, the interior side of the second pipe having a barrier to carbon penetration;
a weld material forming a fluid tight welded joint connecting an end of the first pipe to an end of the second pipe; and
an insulating material in fixed spaced relation to the welded joint, the insulating material positioned to reduce heat transfer from any fluid passing through the first pipe and the second pipe to the welded joint.

Aspect #2 The welded pipe assembly according to aspect #1 wherein the insulating material is compliant.

Aspect #3. The welded pipe assembly according to aspect #1 or aspect #2 wherein the interior side of the first pipe is aluminized to form the barrier to carbon penetration of the first pipe, and the interior side of the second pipe is aluminized to form the barrier to carbon penetration of the second pipe.

Aspect #4. The welded pipe assembly according to aspect #1 or aspect #2 wherein the barrier to carbon penetration of the first pipe is a first diffusion coating and the barrier to carbon penetration of the second pipe is a second diffusion coating.

Aspect #5. The welded pipe assembly according to aspect #4 wherein the first diffusion coating comprises aluminum and wherein the second diffusion coating comprises aluminum.

Aspect #6. The welded pipe assembly according to aspect #1 or aspect #2 wherein the barrier to carbon penetration of the first pipe is formed by chemical vapor deposition and the barrier to carbon penetration of the second pipe is formed by chemical vapor deposition.

Aspect #7. The welded pipe assembly according to any one of the preceding aspects wherein the insulating material is a ceramic fiber comprising one or more of $SiO_2$, $Al_2O_3$, CaO, MgO, ZrO, and $Cr_2O_3$.

Aspect #8. The welded pipe assembly of any one of the preceding aspects further comprising one or more retainers holding the insulating material in place.

Aspect #9. The welded pipe assembly according to aspect #8 wherein the one or more retainers are metal.

Aspect #10. The welded pipe assembly according to any one of the preceding aspects further comprising:
a backing ring proximate the welded joint, the backing ring having a face wherein the face contacts a portion of the interior side of the first pipe and also contacts a portion of the interior side of the second pipe.

Aspect #11. The welded pipe assembly according to aspect #10 wherein the backing ring is metal.

Aspect #12. The welded pipe assembly according to any one of aspects #3 to #5 wherein the weld material is aluminum tolerant.

Aspect #13. The welded pipe assembly according to any one of the preceding aspects wherein the weld material is selected from at least one of Inconel® 53MD, Inconel® 52, Inconel® 52M, Inconel® 152, Inconel® 72, Inconel® 72M, Inconel® 117, and Inconel® 617. and wherein the weld material is different than the alloy of the first pipe and different than the alloy of the second pipe.

Aspect #14. The welded pipe assembly according to any one of the preceding aspects further comprising:
  a shield in fixed spaced relation to the welded joint, wherein the insulating material is at least partially enclosed by a segment of the first pipe, a segment of the second pipe, the backing ring, if present, and the shield, if present.

Aspect #15. The welded pipe assembly according to any one of aspects #1 to #13 wherein the insulating material is at least partially enclosed by the one or more retainers, if present, a segment of the first pipe, a segment of the second pipe, and the backing ring, if present.

Aspect #16. The welded pipe assembly according to aspect #14 or aspect #15 wherein the exterior side of the segment of the first pipe is uninsulated, the exterior side of the segment of the second pipe is uninsulated, and the exterior surface of the welded joint is uninsulated.

Aspect #17. The welded pipe assembly according to any one of aspects #8, #9 and #15 wherein the one or more retainers comprise a first retainer holding a first portion of the insulating material, and a second retainer holding a second portion of the insulating material,
  wherein the first retainer has a first end portion and a second end portion, the first end portion of the first retainer attached to the first pipe,
  wherein the second retainer has a first end portion and a second end portion, the first end portion of the second retainer attached to the second pipe, and
  wherein the second end portion of the first retainer abuts against the second end portion of the second retainer.

Aspect #18. The welded pipe assembly according to any one of aspects #8, #9, #15, and #16, wherein the one or more retainers comprise a first retainer holding a first portion of the insulating material, and a second retainer holding a second portion of the insulating material,
  wherein the first retainer has a first end portion and a second end portion, the first end portion of the first retainer attached to the first pipe,
  wherein the second retainer has a first end portion and a second end portion, the first end portion of the second retainer attached to the second pipe, and
  wherein the second end portion of the first retainer overlaps the second end portion of the second retainer.

Aspect #19. The welded pipe assembly according to aspect #17 or aspect #18 wherein the first end portion of the first retainer is attached to the first pipe by a second fluid tight welded joint and the first end portion of the second retainer is attached to the second pipe by a third fluid tight welded joint.

Aspect #20. The welded pipe assembly according to any one of aspects #17 to #19 wherein the first retainer has a wall portion converging inward from the first end portion of the first retainer.

Aspect #21. The welded pipe assembly according to any one of aspects #17 to #20 wherein the second retainer has a wall portion diverging outward toward the first end of the second retainer.

Aspect #22. The welded pipe assembly according to any one of the preceding aspects further comprising a first thermal insulation disposed to thermally insulate the exterior side of the first pipe away from the welded joint and a second thermal insulation (90) disposed to thermally insulate the exterior side of the second pipe away from the welded joint.

Aspect #23. The welded pipe assembly according to aspect #22 wherein the first thermal insulation is jacketed.

Aspect #24. The welded pipe assembly according to aspect #22 or aspect #23 wherein the second thermal insulation is jacketed.

Aspect #25. A method for protecting a welded pipe assembly from metal dusting when conveying a hot gas comprising CO at a temperature greater than 425° C. through a first pipe and a second pipe, the first pipe and the second pipe connected by a welded joint, the first pipe having an exterior side and an interior side opposite the exterior side, the interior side of the first pipe having a barrier to carbon penetration, the second pipe having an exterior side and an interior side opposite the exterior side, the interior side of the second pipe having a barrier to carbon penetration, the welded joint having an exterior surface, the method comprising:
  thermally insulating the exterior side of the first pipe away from the welded joint and thermally exposing an area of the exterior side of the first pipe adjacent the welded joint thereby removing heat at a faster rate from the exterior side of the first pipe adjacent the welded joint than from the exterior side of the first pipe away from the welded joint;
  thermally insulating the exterior side of the second pipe away from the welded joint and thermally exposing an area of the exterior side of the second pipe adjacent the welded joint thereby removing heat at a faster rate from the exterior side of the first pipe adjacent the welded joint than from the exterior side of the first pipe away from the welded joint;
  thermally exposing the exterior surface of the welded joint; and
  thermally insulating the welded joint opposite the exposed exterior surface, a portion of the interior side of the first pipe adjacent the welded joint, and a portion of the interior side of the second pipe adjacent the welded joint with an insulating material;
  wherein, in combination, the insulating material that thermally insulates the welded joint, the portion of the interior side of the first pipe, and the portion of the interior side of the second pipe, the exposed area of the exterior side of the first pipe, the exposed area of the exterior side of the second pipe, and the exposed exterior surface of the welded joint are sufficient to maintain a temperature of the exterior surface of the welded joint below 400° C.

Aspect #26. The method according to aspect #25 further comprising shielding the insulating material from the hot gas.

Aspect #27. The method according to aspect #25 or aspect #26 using any one of the welded pipe assemblies according to aspects #1 to #24.

Aspect #28. The method according to aspect #25 or aspect #26 further comprising providing any one of the welded pipe assemblies according to aspects #1 to #24.

DETAILED DESCRIPTION

Figure 1:
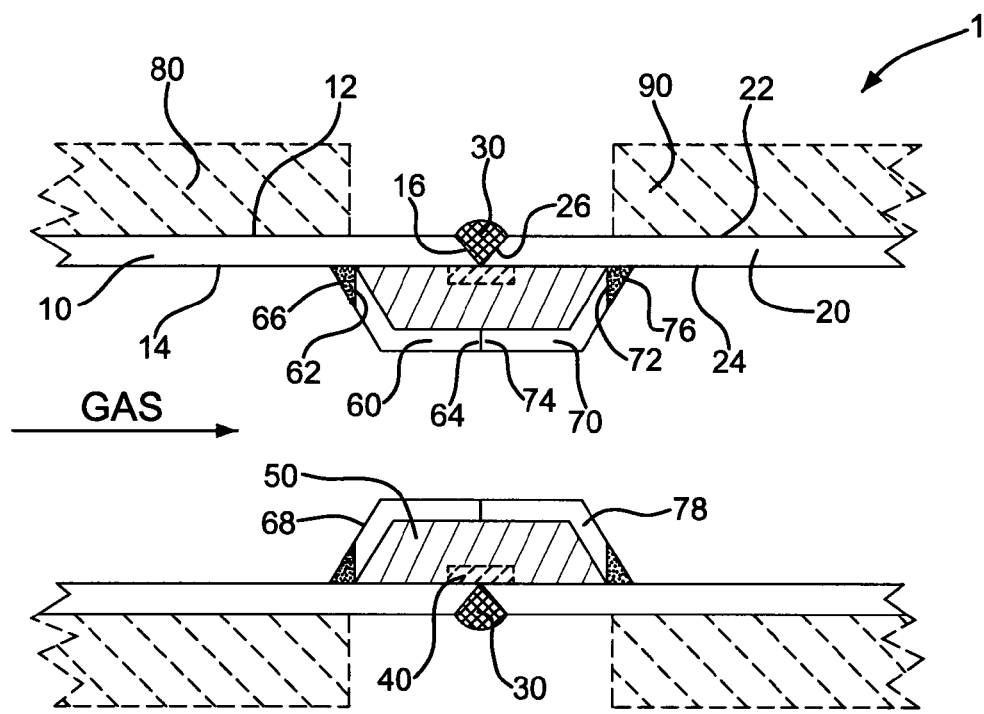
FIG. 1 illustrates a welded pipe assembly with abutted retainers.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of the first entity, (2) the second entity, and (3) the first entity and the second entity. The term "and/or" placed between the last two entities of a list of 3 or more entities means at least one of the entities in the list.

The present invention relates to a method for protecting a welded pipe assembly from metal dusting and a welded pipe assembly suitable for performing the method. The welded pipe assembly comprises two pipes, weld material, and an insulating material that insulates the weld material from any hot gas conveyed through the welded pipe assembly. The present invention is particularly useful for conveying gases comprising carbon monoxide at temperatures greater than 425° C. while preventing metal dusting of the welded piping assembly.

Hot gas comprising CO is conveyed through the welded pipe assembly comprising a first pipe and a second pipe, the first pipe and the second pipe connected by a welded joint. The first pipe and the second pipe each have an exterior side and an interior side opposite the exterior side. The interior side of the first pipe and the interior side of the second pipe each have a barrier to carbon penetration (discussed below).

Since the gases comprising carbon monoxide are conveyed at temperatures greater than 425° C., it is generally desirable to thermally insulate the piping system to minimize energy losses from the piping system.

The method comprises thermally insulating the exterior side of the first pipe away from the welded joint and thermally exposing an area of the exterior side of the first pipe adjacent the welded joint.

"Thermally insulating" and "thermally exposing" means that heat is removed at a faster rate from the thermally exposed exterior side of the pipe adjacent the welded joint than from the thermally insulated exterior side of the pipe away from the welded joint. Pipe may be thermally insulated by providing any form of thermal insulation to the pipe.

The method also comprises thermally insulating the exterior side of the second pipe away from the welded joint and thermally exposing an area of the exterior side of the second pipe adjacent the welded joint.

The method also comprises thermally exposing the exterior surface of the welded joint.

The method also comprises thermally insulating the welded joint opposite the exposed exterior surface, a portion of the interior side of the first pipe adjacent the welded joint, and a portion of the interior side of the second pipe adjacent the welded joint with an insulating material. The insulating material may be a compliant insulating material.

According to the method, in combination, the insulating material that thermally insulates the welded joint, the portion of the interior side of the first pipe, and the portion of the interior side of the second pipe, the exposed area of the exterior side of the first pipe, the exposed area of the exterior side of the second pipe, and the exposed exterior surface of the welded joint are sufficient to maintain a temperature of the exterior surface of the welded joint below 400° C., or below 350° C., or below 300° C. The skilled person can readily determine suitable combinations of insulating material and uninsulated exterior surface area required to maintain the temperature of the welded joint below the desired temperature (400° C., 350° C., or 300° C.) for various expected temperature ranges for the conveyed gas and expected ambient conditions.

The temperature of the exterior surface of the welded joint may be measured by any suitable technique, for example by an infrared thermometer, or contact thermocouple.

The method may further comprise shielding the insulating material from the hot gas being conveyed through the pipes.

The method may be carried out by the welded pipe assembles illustrated in the figures. The present invention also relates to the welded pipe assembly.

The welded pipe assembly is described with reference to the figures, wherein like reference numbers refer to like elements through the several embodiments.

The welded pipe assembly 1 comprises:
 a first pipe 10 having an exterior side 12 and an interior side 14 opposite the exterior side 12, the interior side of the first pipe 10 having a barrier to carbon penetration;
 a second pipe 20 having an exterior side 22 and an interior side 24 opposite the exterior side, the interior side of the second pipe 20 having a barrier to carbon penetration;
 a weld material forming a fluid tight welded joint 30 connecting an end 16 of the first pipe 10 to an end 26 of the second pipe 20; and
 an insulating material 50 in fixed spaced relation to the welded joint 30, the insulating material positioned to reduce heat transfer from any fluid passing through the first pipe 10 and the second pipe 20 to the welded joint 30.

As used herein, an insulating material is any material that reduces heat transfer and has a bulk thermal conductivity less than 5 W/mK. The insulating material may have a bulk thermal conductivity less than 1 W/mK.

The insulating material may be compliant. As used herein, compliant means not rigid and able to adapt to contraction and expansion of its surroundings without failing catastrophically. Examples of compliant insulating materials include insulation in the form of blankets, bats, modules, felt, paper and loose (bulk) fiber. These materials may be ceramic fiber, foams, or microporous insulation. These materials may also be adhesives or mastics and may be any combination of the above or may include fairly rigid components such as vacuum formed shapes or boards and compliant layers. Major manufacturers of such products include Thermal Ceramics and ANH Refractories. The insulating material may be a ceramic comprising one or more of $SiO_2$, $Al_2O_3$, CaO, MgO, ZrO and $Cr_2O_3$.

A person skilled in the art may select a suitable insulating material based on its bulk thermal conductivity, weight, plasticity, and/or other relevant properties. The required thickness of the insulating material may be calculated by the person skilled in the art based on, for example, the expected temperature and properties of the gas conveyed in the pipe, expected range of ambient conditions, and the desired temperature of the welded joint.

As used herein, a pipe is any conduit or hollow body for conveying a fluid. The pipe may have a circular cross-section or any other suitable cross-section. Pipe is typically intended to have a round cross-section, but a certain degree of ovality is expected. The pipe may be produced by casting, extrusion, rolling and welding flat sheet, or by other known methods. The pipe may be straight, elbow-shaped, Tee-shaped, or other suitable shape. The pipe cross-section may increase or decrease over its length.

The first pipe 10 and the second pipe 20 may be constructed from any metal or alloy suitable for the service in which it is employed. Those skilled in the art may readily select from various metals and alloys based on availability, cost, strength, chemical compatibility, etc. The first pipe and the second pipe may be constructed from stainless steels such as 304, 316 or 347. The first pipe and the second pipe may be constructed from higher grade alloys such as alloy 800 or 617 or from lower grade alloys such as ASTM materials A335 P11 or P22.

As used herein, a weld material is any material suitable for forming a welded joint, such as welding wire. Since the article "a" means one or more when applied to any feature, one or more weld materials may be used to form the fluid tight welded joint. Any suitable weld material may be used that is appropriate for the pipe alloy and strength requirements. There may be additional limitations on the choice of weld material if the barrier coating is incorporated into the weld. As this method protects the weld and adjacent pipe material against metal dusting, the coating need not extend all the way to the weld bevel.

The interior side of the first pipe may be aluminized to form the barrier to carbon penetration of the first pipe, and the interior side of the second pipe may be aluminized to form the barrier to carbon penetration of the second pipe.

The aluminized surface may be formed by any known aluminizing technique. Aluminizing to form an aluminized surface includes chemical vapor deposition, cold spray, plasma spray, flame spray, and arc spray techniques.

The barrier to carbon penetration of the first pipe may be a first diffusion coating and the barrier to carbon penetration of the second pipe may be a second diffusion coating. The first diffusion coating and the second diffusion coating may be the same type of diffusion coating. The diffusion coatings may comprise aluminum.

As defined herein, and consistent with ASTM Designation B 875-96 (Reapproved 2008), a diffusion coating is one produced by causing an element to react with or diffuse into, or both, the surface of a metallic substrate, thus, chemically altering the surface of the substrate.

A diffusion coating may also be called a diffusion alloy layer. The diffusion coating may be formed by chemical vapor deposition or other known process. For example, Endurance Technologies offers EndurAlon™, a diffusion alloying process that diffuses aluminum molecules directly into a substrate material.

Any suitable barrier to carbon penetration may be used. The barrier may comprise one or more of chromium, silicon, aluminum, titanium, tin, and yttrium.

The barrier to carbon penetration may be degraded or ruined in the heat affected zone near the welded joint from welding and/or preparation for welding. The barrier to carbon penetration of the first pipe may cover a portion of the of the interior side of the first pipe not covered by the insulating material. The barrier to carbon penetration of the second pipe may cover a portion of the of the interior side of the second pipe not covered by the insulating material.

The welded pipe assembly may further comprise a backing ring 40 proximate the welded joint 30, the backing ring 40 having a face wherein the face contacts a portion of the interior side 14 of the first pipe 10 and also contacts a portion of the interior side 24 of the second pipe 20. Any suitable backing ring may be used. The backing ring may be metal and constructed from any suitable metal known in the art. The backing ring, if used, is positioned to facilitate forming of the welded joint without porosity.

The welded pipe assembly may further comprise one or more retainers 60, 70 holding the insulating material 50 in place. The one or more retainers 60, 70 may be metal. The one or more retainers may also act as a shield or barrier to hinder process gas from contacting the insulating material, backing ring and/or weld material. The one or more retainers may help prevent erosion and/or abrasion of the insulating material. The insulating material is at least partially enclosed by the one or more retainers, a segment of the first pipe, a segment of the second pipe, and the optional backing ring, if present.

The one or more retainers may be positioned to shield or provide a barrier to the heat-affected zones of the first pipe and the second pipe adjacent to the welded joint. The section of pipe adjacent the welded joint is heated during welding and is referred to as the heat-affected zone. The heat-affected zone, or portion thereof, is often cleaned prior to the welding operation. The heating and/or cleaning may affect the properties of the surface of the pipe in the heat-affected zone. For example, if the pipe is coated or aluminized, the heating and/or cleaning may adversely affect the coating or surface properties resulting in reduced protection from metal dusting. Proper positioning of the insulation provides the technical effect preventing any adverse effect of degraded surface properties due to heating and/or cleaning prior to welding.

When the barrier to carbon penetration comprises aluminum, the weld material is preferably aluminum tolerant. An aluminum tolerant weld material is any weld material that when interfused with aluminum does not crack in service. Suitable weld materials include and may be selected from one or more of Inconel® 53MD, Inconel® 52, Inconel® 52M, Inconel® 152, Inconel® 72, Inconel® 72M, Inconel® 117, and Inconel® 617.

In case the retainers 60 and 70 do not act as a shield or barrier to hinder process gas from contacting the insulating material, optional backing ring, and/or weld material, the welded pipe assembly may further comprise a separate shield (not shown in the figures). The shield, if present, is in fixed spaced relation to the welded joint. The insulating material is at least partially enclosed by a segment of the first pipe, a segment of the second pipe, the optional backing ring, if present, and the shield, if present.

To facilitate maintaining the exterior surface of the welded joint below 400° C., the exterior side 12 of the segment of pipe 10 may be uninsulated, the exterior side 22 of the segment of pipe 20 may be uninsulated, and the exterior surface of the welded joint 30 may be uninsulated. The exterior surface of the welded joint is the surface facing away from the insulating material 50.

To reduce heat losses from the welded pipe assembly, the welded pipe assembly may further comprise thermal insulation 80 disposed to thermally insulate the exterior side 12 of the first pipe 10 away from the welded joint 30 and thermal insulation 90 disposed to thermally insulate the exterior side 22 of the second pipe 20 away from the welded joint 30. The thermal insulation may be ceramic fiber blanket. a calcium silicate type product, or other suitable thermal insulation known in the art.

Thermal insulation 80 and thermal insulation 90 may each be jacketed. The jacket may be thin gauge stainless steel or aluminum sheet wrapped around the insulation to protect the insulation from the weather.

The combination of having thermal insulation on the first pipe 10 and second pipe 20 away from the welded joint, and having an insulating material 50 positioned to reduce heat transfer from any fluid passing through the pipes to the welded joint 30, while the exterior side 12 of a segment of pipe 10 adjacent the welded joint 30 is uninsulated (i.e. the exposed area of the first pipe), the exterior side 22 of the second pipe 20 adjacent the welded joint 30 is uninsulated (i.e. the exposed area of the second pipe), and the exterior surface of the welded joint is uninsulated (i.e. the exposed exterior surface of the welded joint) can provide the method requirement to maintain the temperature of the exterior surface of the welded joint below 400° C.

The gap between insulation 80 on the exterior side of pipe 10 and insulation 90 on the exterior side of pipe 20 may have a length ranging from 50 mm to 1000 mm.

The length of the insulating material 50 may range from 50 mm to 1000 mm. The length corresponds to the lengthwise dimension of the pipes.

The interior and exterior insulated zones may overlap or there may be a gap between the two.

FIG. 1 shows a welded pipe assembly where the retainers are abutted. The first retainer 60 holds a first portion of the insulating material 50 and the second retainer 70 holds a second portion of the insulating material 50. The first retainer 60 has a first end portion 62 and a second end portion 64. The first end portion 62 of the first retainer 60 is attached to the first pipe 10. The second retainer 70 has a first end portion 72 and a second end portion 74. The first end portion 72 of the second retainer 70 is attached to the second pipe 20. The second end portion 64 of the first retainer 60 abuts against the second end portion 74 of the second retainer 70.

Figure 2:
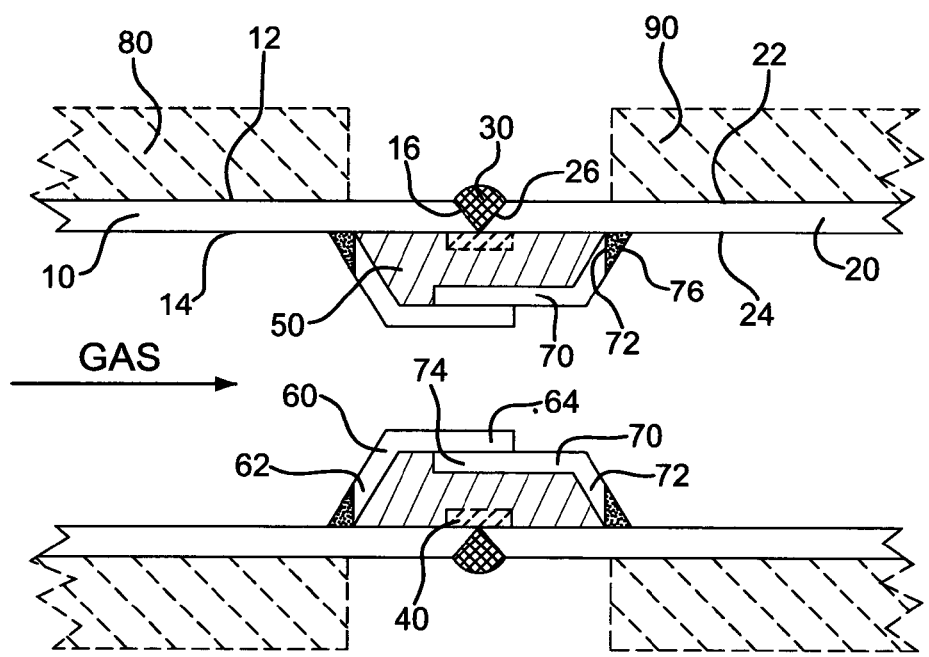
FIG. 2 illustrates a welded pipe assembly with overlapping retainers.

FIG. 2 shows a welded pipe assembly where the retainers are overlapping. The first retainer 60 holds a first portion of the insulating material 50 and the second retainer 70 holds a second portion of the insulating material 50. The first retainer 60 has a first end portion 62 and a second end portion 64. The first end portion 62 of the first retainer 60 is attached to the first pipe 10. The second retainer 70 has a first end portion 72 and a second end portion 74. The first end portion 72 of the second retainer 70 is attached to the second pipe 20. The second end portion 64 of the first retainer 60 overlaps the second end portion 74 of the second retainer 70.

Figure 3:
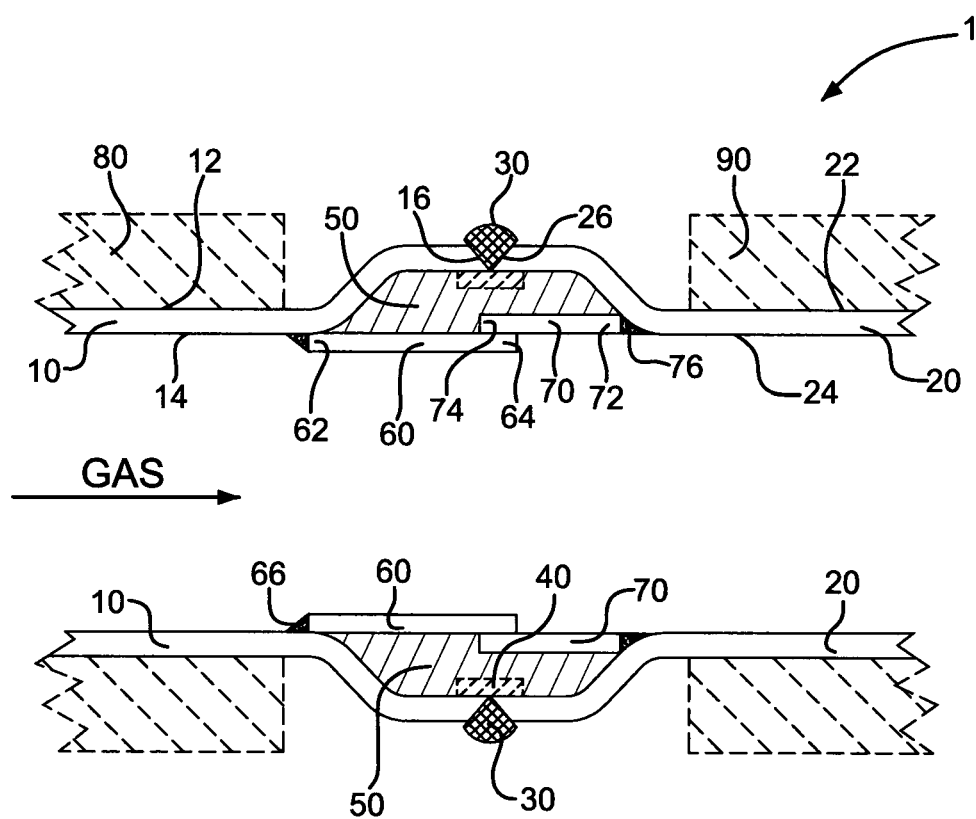
FIG. 3 illustrates a welded pipe assembly with modified pipe ends.

FIG. 3 shows a welded pipe assembly with modified pipe ends. FIG. 3 shows the overlapping retainers 60 and 70, however, the modified pipe ends can also be used with abutting retainers. The pipe ends may be flared or otherwise modified as shown, so that the internal insulation does not obstruct the flow of the gas in the pipes.

In any of the welded pipe assemblies shown in the figures, the first retainer 60 may be attached to the first pipe 10 by several tack welds, a full circumference filet weld, press fit, or any suitable attachment means.

A full circumference filet weld provides the benefit of forming a seal to keep the process gas from getting behind the retainers and blowing the insulating material out of the retainer. Since the internal filet welds attaching the retainers are exposed to the process gas at the process gas temperature, the internal filet welds will be subject to metal dusting. The retainer may be installed with a full circumferential filet weld and aluminized along with the interior of the pipe to protect it from metal dusting. Alternatively these welds may be protected by maintaining the temperature of these welds below their metal dusting temperature by providing a combination of interior and exterior insulation resulting in cooler temperatures and low metal dusting rates. The retainers may be full "cylinders" so that until the internal filet weld is completely deteriorated, the retainer cannot be blown downstream away from the welded joint. Further, the insulating material may be tightly packed between the retainers and the pipes so that the process gas will not flow through the tightly packet insulating material, since the process gas will tend to follow the path of least flow resistance.

In accord with the full circumference filet weld, the first end portion 62 of the first retainer may be attached to the first pipe 10 by a fluid tight welded joint 66 and the first end portion 72 of the second retainer 70 may be attached to the second pipe 20 by a fluid tight welded joint 76.

As shown in FIG. 1 and FIG. 2, the first retainer 60 may have a wall portion 68 converging inward from the first end portion 62 of the first retainer 60.

As shown in FIG. 1 and FIG. 2, the second retainer 70 may have a wall portion 78 diverging outward toward the first end of the second retainer 70.

EXAMPLES

A welded pipe assembly closely resembling FIG. 2 was fabricated and tested. The pipe diameter was about 35 cm. The insulating material on the inside of the pipe was ceramic fiber insulation with a thickness of about 2 cm. The length of the internally insulated zone was about 20 cm.

The temperatures of the exterior surface of the pipes were measured using an infrared thermometer on the uninsulated weld, an uninsulated area slightly upstream of the weld, and an uninsulated area slightly downstream of the weld. The temperature was measured at 4 positions around the circumference: the 12 o'clock position (top), 3 o'clock position, 6 o'clock position, and 9 o'clock position.

Table 1 shows the measured temperatures for a first welded pipe assembly. The temperatures of the gas flowing though the welded pipe assembly was about 570° C.

The results show that the temperature of the pipe, particularly the temperature of the weld can be maintained below 400° C.

TABLE 1

| position | T downstream (° C.) | T weld (° C.) | T upstream (° C.) |
|---|---|---|---|
| 12 o'clock | 307 | 163 | 240 |
| 3 o'clock | 306 | 169 | 267 |
| 6 o'clock | 317 | 143 | 281 |
| 9 o'clock | 243 | 131 | 242 |

Although the present invention has been described as to specific embodiments or examples, it is not limited thereto, but may be changed or modified into any of various other forms without departing from the scope of the invention as defined in the accompanying claims.

We claim:

1. A method for protecting a welded pipe assembly from metal dusting when conveying a gas comprising CO at a temperature greater than 425° C. through a first pipe and a second pipe, the first pipe and the second pipe connected by a welded joint, the first pipe having an exterior side and an interior side opposite the exterior side, the interior side of the first pipe having a barrier to carbon penetration, the second pipe having an exterior side and an interior side opposite the exterior side, the interior side of the second pipe having a barrier to carbon penetration, the welded joint having an exterior surface, the method comprising:

thermally insulating the exterior side of the first pipe away from the welded joint and thermally exposing an area of the exterior side of the first pipe adjacent the welded joint;

thermally insulating the exterior side of the second pipe away from the welded joint and thermally exposing an area of the exterior side of the second pipe adjacent the welded joint;

thermally exposing the exterior surface of the welded joint; and thermally insulating the welded joint opposite the exposed exterior surface, a portion of the interior side of the first pipe adjacent the welded joint, and a portion of the interior side of the second pipe adjacent the welded joint with a compliant insulating material;

wherein, in combination, the compliant insulating material, the exposed area of the exterior side of the first pipe, the exposed area of the exterior side of the second pipe, and the exposed exterior surface of the welded joint are sufficient to maintain a temperature of the exterior surface of the welded joint below 400° C.

2. The method of claim 1 further comprising:

shielding the compliant insulating material from the gas.

\* \* \* \* \*